(12) United States Patent
Koumura et al.

(10) Patent No.: US 6,243,806 B1
(45) Date of Patent: *Jun. 5, 2001

(54) PROGRAM EXECUTION METHOD AND APPARATUS EMPLOYING DATA FLAGS FOR BRANCHING DETERMINATION

(75) Inventors: Yasuhito Koumura, Tokyo; Hiroki Miura, Warabi; Kenshi Matsumoto, Koshigaya, all of (JP)

(73) Assignee: Sanyo Electric Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,502

(22) Filed: Sep. 10, 1997

(30) Foreign Application Priority Data

Sep. 13, 1996 (JP) .................................................... 8-243884

(51) Int. Cl.⁷ ........................................................ G06F 9/38
(52) U.S. Cl. ............................................ 712/234; 708/212
(58) Field of Search ..................................... 395/581; 712/5, 712/234; 708/212

(56) References Cited

U.S. PATENT DOCUMENTS

| | | | |
|---|---|---|---|
| 5,053,986 | * 10/1991 | Ahsan et al. ........................ | 708/520 |
| 5,142,489 | 8/1992 | Yamaki ............................... | 708/521 |
| 5,321,820 | 6/1994 | Nakajima ........................... | 712/239 |
| 5,440,702 | * 8/1995 | Brewer et al. ...................... | 395/564 |
| 5,561,619 | * 10/1996 | Watanabe et al. ................. | 364/736.5 |
| 5,584,001 | * 12/1996 | Hoyt et al. .......................... | 395/585 |
| 5,638,312 | * 6/1997 | Simone .............................. | 364/736.5 |
| 5,649,174 | * 7/1997 | Dockser ............................. | 713/501 |
| 5,692,146 | * 11/1997 | Yamamoto et al. ................ | 711/200 |

OTHER PUBLICATIONS

Hennessy, John L. and Patterson, David A. "Computer Architecture: A Quantitative Approach." Copyright 1990 by Morgan Kaufmann Publishers, Inc. pp. 248–271, (In Japanese).

*Computer Architecture A Quantitative Approach*, by David A. Patterson and John L. Hennessy; Second Edition 1996; pp. 136–178.

* cited by examiner

Primary Examiner—Kenneth S. Kim
(74) Attorney, Agent, or Firm—Hogan & Hartson, LLP

(57) ABSTRACT

A group of registers 26 consists of a plurality of general-purpose registers R0, R1, . . . . A flag is provided for each of these general-purpose registers. When data to be written to, for instance, general-purpose register R0 is zero, the register flag is set in conjunction with the data writing. Thereafter, it is possible to determine with a conditional branching instruction if the general-purpose register R0 data is zero by looking at the flag, and there is no need to read out data and perform a computation.

8 Claims, 4 Drawing Sheets

PROGRAM EXECUTION METHOD AND APPARATUS EMPLOYING DATA FLAGS FOR BRANCHING DETERMINATION

BACKGROUND OF THE INVENTION

1. Field of the Invention

The present invention relates to a program execution method and a device using the same. In particular, the present invention relates to a program execution method which uses data holding unit based on a general-purpose register and to a program execution device using said method. The present invention can, for example, be applied in a microprocessor which uses a pipeline method.

2. Description of the Related Arts

A RISC (Reduced Instruction Set Computer) single-chip microprocessor is a device simultaneously offering high processing performance in all types of usage, low power consumption and small system area. This type of microprocessor often uses a pipeline method of internal data processing, in which processing is divided into multiple stages and multiple instructions are simultaneously processed in different stages, thereby increasing processing speed. Therefore, the consideration of branching instructions which disrupt the flow of pipeline processing is recognized as an important aspect of microprocessor design.

FIG. 3 shows pipeline processing in a generally used conventional microprocessor. In FIG. 3, processing is at a different stage at each clock and, in the example depicted, 1 instruction is processed completely in 5 stages. These 5 stages are expressed as IF, ID, EX, MEM, WB, and respectively denote: Instruction Fetch, Instruction Decode (and read-out from register), Computation, Memory Access, and Write-Back of necessary data to the register.

Now let us assume that instruction 1 is a branching instruction which generates branching when data in a general-purpose register referred to in the instruction is zero. Ordinarily, the EX stage determines if the data in the general-purpose register is zero. Consequently, when branching is actually generated, the branching destination address is fetched from the instruction memory by an instruction whose IF stage (shaded in the diagram) commences simultaneously with the end of the EX stage of instruction 1 (shaded in the diagram), namely instruction 4. Therefore, in this configuration, branching delay is 2 cycles. "Branching delay" denotes the number of cycles (in this example, cycles 2 and 3) between a cycle which processes a branching instruction and a cycle which actually commences processing the instruction at the branching destination. When there are many such cycles, the penalty for branching increases, hindering high-speed processing.

A technique for reducing branching delay was proposed in "Computer Architecture—A Quantitative Approach to Design, Realization and Evaluation" (David A. Patterson and John L. Hennessy, Nikkei BP Publications), pages 262~264. FIG. 4 shows a virtual microprocessor DLX branching determining circuit as discussed in the above publication. In DLX, a zero determining portion 6 is provided for determining whether or not register data between a group of registers 2 and a computing unit 4 is zero; a branching determining portion 8 is provided for determining if branching has occurred based on the result of the zero determining portion. The determination result is sent to a circuit comprising an IF stage and the address of the next instruction to be fetched is specified.

In this configuration, data is read out from the register during the ID stage and the computation unit 4 computes the data during the EX stage. So far, this is identical to the conventional method. However, it is the zero determining portion 6, and not the computation unit 4, which determines if the register data is zero. The zero determining portion 6 is provided specifically for this function, and determining is thus completed during the ID stage. As a result, fetching of the instruction at a branching destination address can commence simultaneously with the end of the ID stage, without waiting for the end of the EX stage. FIG. 5 is a diagram showing the pipeline processing in a DLX microprocessor when a program branches. Here, a branching destination address is fetched in the IF stage (shaded) of instruction 3 which commences when the ID stage (shaded) of instruction 1 ends. Branching delay can thereby be reduced by 1 cycle.

DLX has a branching delay of 1 cycle, which is regarded as the minimum delay possible with an ordinary pipeline-system microprocessor. However, even with the same branching delay, how high the clock frequency can be raised with the given circuit configuration is another matter. Even when branching delay is reduced to 1 cycle, the overall performance will lower if clock frequency has to be lowered by 10% due to the critical path resultantly created. In the case of DLX, a zero determining portion 6 is provided to the ID stage as shown in FIG. 4, but since this determining circuit determines the zero states of 32 bits of data input thereto, this naturally causes delay. Attempting to conclude the determining of zero and branching in the ID stage inevitably lowers the maximum clock frequency.

SUMMARY OF THE INVENTION

The present invention has been devised after consideration of the above points and aims to provide a program execution method and device capable not only of minimizing branching delay, but also of raising maximum clock frequency.

In order to achieve the above objectives, when storing data in data holding unit, a program execution method of the present invention records whether or not the data has a value. Then, when it is necessary to determine if data stored in the data holding unit has a value in a predetermined set of values, the record is referenced instead of the data holding unit. The "predetermined set of values" here is fixed as required on a case by case basis, and may consist of multiple values such as, for instance, "−1 and 1" or "positive integers."

As explained above, the problem is the delay caused by judging the content of data stored in the data holding unit. In order to solve this problem, the fact of whether or not the value of the data belongs to a predetermined set of values is recorded together with the data. In order to judge if data has a value in a predetermined set of values, rather than performing an arithmetic computation on the data in the data holding unit, the content of this record is referenced. It is thus possible to reduce the time required for judging. Consequently, in addition to reducing branching delay, it becomes easier to raise clock frequency.

In the program execution device of the present invention, a flag for indicating whether or not data held by the data holding unit has a value belonging to a predetermined set of values is provided in a one-to-one relationship with the data holding unit. When this flag is a zero flag, it can be used for many branching judgement. The data holding unit may, for instance, comprise a general-purpose register. In this configuration, since it is possible to judge if data stored in the data holding unit has a value belonging to a predetermined set of values simply by checking the flag, processing performance can be improved.

A conventional microprocessor includes a system called condition coding and has a flag such as a zero flag which reflects the computation result. However, this flag only reflects the result of the previous computation and does not correspond directly to the register contents. Consequently, in the case of a register whose contents were written some time earlier, it is only possible to determine if the data in the register is zero by performing a computation for the data once again. This restricts high-speed processing.

One aspect of the program execution device of the present invention comprises data holding unit for holding data required to execute a program; a flag provided in a one-to-one relationship with the data holding unit; computing unit for performing computations to data held in the data holding unit; judging unit for judging if the value of data obtained by computation belongs to a predetermined set of values; rewriting unit for rewriting data obtained by computation in the data holding unit; and flag altering unit for altering a state of the flag in accordance with whether or not the value of rewrite data belongs to a predetermined set of values.

In this configuration, the computing unit performs computations on data held in the data holding unit. Judging unit judges whether or not computed data has a value belonging to a predetermined set of values. Write back unit writes back computed data to the data holding unit as required. Flag altering unit alters the state of the flag in accordance with whether or not write back data has a value in a predetermined set of values. Thus it is possible to learn if data in given data holding unit has a value in a predetermined set of values by referencing the relevant flag. There is no need to perform a computation on data in the register as is the case in condition coding and it is possible to reduce branching delay, for instance.

Furthermore, in this configuration, since the route between judging whether or not a flag should be altered and writing this fact back into the data holding unit is not critical, there is no need for the judging unit to perform at high-speed. In other words, since no critical path is created as in the conventional technology described above, clock frequency can be raised.

DESCRIPTION OF THE PREFERRED EMBODIMENT

Figure 1:
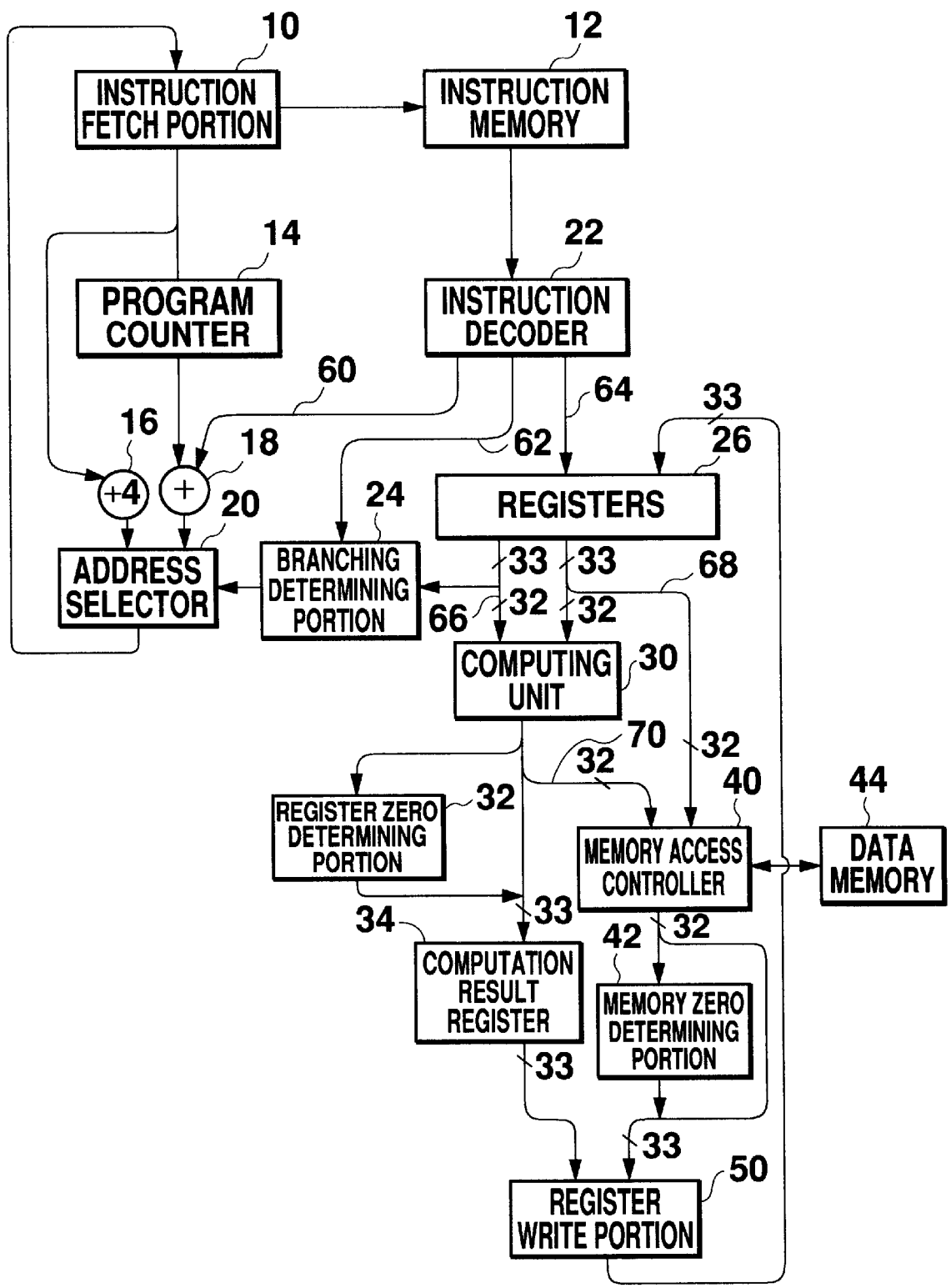
FIG. 1 is a diagram showing the internal configuration of a microprocessor comprising a program execution device in an embodiment of the present invention.

The preferred embodiment of the present invention will next be explained with reference to the diagrams.
[1] Overall Configuration and Operation of the Device FIG. 1 shows the internal configuration of a microprocessor comprising a program execution device in an embodiment of the present invention. The microprocessor is a 32-bit processor using a pipeline system in which data is processed in 5 stages: IF, ID, EX, MEM, WB. Each section of the circuit is concerned with one of these 5 stages.

1. IF Stage Circuit

Instruction fetch portion 10 supplies an address for fetching an instruction from instruction memory 12 and controls the reading out of the instruction. In order to calculate the next fetch address, first adder 16 adds 4 (which is the length of one instruction byte) to the current fetch address. Second adder 18 adds an offset address 60 for branching to an address held in a program counter 14 described below. This offset address is supplied by an instruction decoder 22 described below. An address selector 20 selectively outputs the output of the first adder 16 when there is no branching and selectively outputs the output of the second adder 18 when branching. A branch determining portion 24 explained below determines whether or not there is branching. The address selected by address selector 20 is sent to instruction fetch portion 10 and used as the next fetch address.

2. ID Stage Circuit

Instruction decoder 22 decodes the instruction read out from instruction memory 12. Program counter 14 holds the address of the instruction presently being decoded. After decoding, the offset address 60 is sent to the second adder 18 to indicate a branching destination address. The register number 64 or the like to be accessed is sent from instruction decoder 22 to registers 26. Instruction decoder 22 outputs an identification signal 62 indicating whether or not the decoded instruction is a branching instruction to branch determining portion 24.

Figure 2:
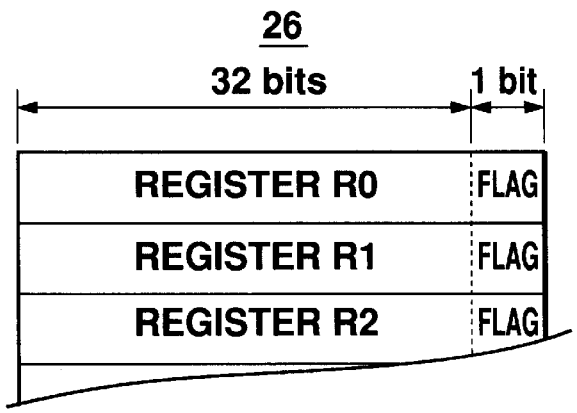
FIG. 2 is a diagram showing the configuration of registers 26 in an embodiment of the present invention.
Figure 3:
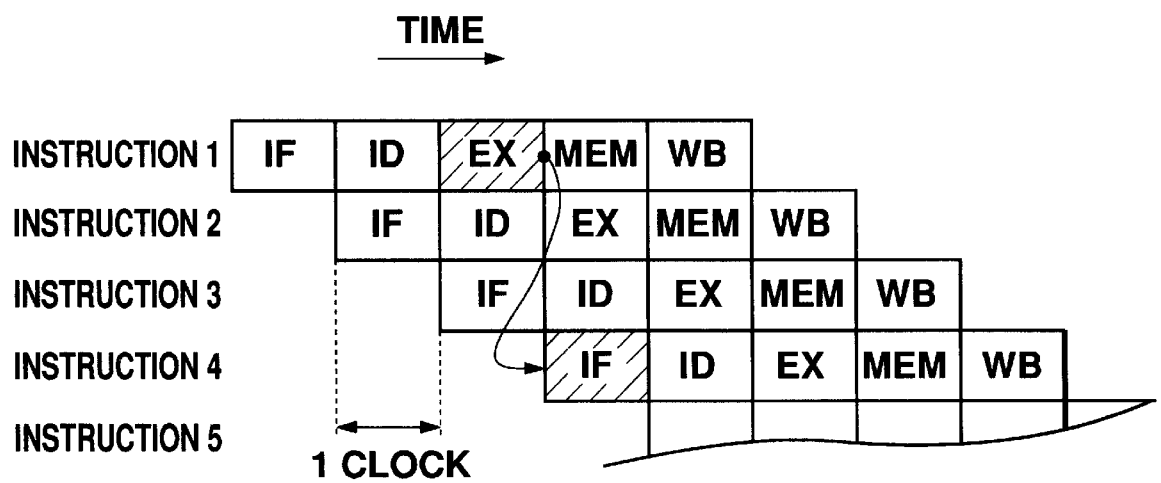
FIG. 3 is a diagram showing pipeline processing in a generally used conventional microprocessor.

FIG. 2 shows the configuration of registers 26 which consists of a plurality of general-purpose registers for operating the microprocessor. 1-bit flags are provided in one-to-one relationships to conventional 32-bit general-purpose registers R0, R, R2 . . . . In the present embodiment, when data is read out from a general-purpose register, the corresponding flag is also read out. As explained below, each flag is set only when the data in the corresponding general-purpose register is zero.

From the data 66 read out from registers 26, the 1 bit which relates to the flag is sent to branch determining portion 24 and the other 32 bits are sent to computation unit 30 and memory access controller 40. Branch determining portion 24 controls the address selection of address selector 20. More concretely, branch determining portion 24 indicates that identification signal 62 is a branching instruction and, when the flag indicates branching, branch determining portion 24 instructs the address selector 20 to select the output of second adder 18. This is because one type of branching instruction indicates branching when the flag is set; and, conversely, another type of branching instruction indicates branching when the flag is cleared.

3. EX Stage Circuit

Computation unit 30 carries out a predetermined computation to data 66 sent from registers 26. Simultaneously, register zero determining portion 32 determines if the general-purpose register data has changed to zero as a result of the computation. The register zero determining portion 32 performs 32 input NOR or a similar logical function. The computation result and the determination result of register zero determining portion 32 are stored as 33-bit data in computation result register 34, which outputs to register write portion 50.

The determination result of register zero determining portion 32 corresponds to a zero flag in a condition code system, but it is a feature of the present embodiment that this result is finally rewritten to the flag of the general-purpose register which now has zero data.

4. MEM Stage Circuit

Data memory 44 is used as a work area and access thereto is controlled by memory access controller 40. Data 68 to be stored in data memory 44 are sent to memory access controller 40 from registers 26. Furthermore, a memory address is sent from computation unit 30.

The memory zero determining portion 42 determines whether or not data read out from data memory 44 is zero. This is in order to correctly alter the flag when this data is loaded into a general-purpose register. Data which has been read out and the result of memory zero determining portion 42 are sent as 33-bit data to register write portion 50.

5. WB Stage Circuit

Register write portion 50 rewrites required data in the general-purpose register. In compliance with the processing at that time, either the output of computation result register 34 or the output of data memory 44 is selected and rewritten into the general-purpose register. Simultaneously, the flag of the general-purpose register is altered.

[2] Flag Operations

Flag operations characteristic of the present embodiment will next be explained.

1. Flag Preparation

When an arithmetic computation has been performed between general-purpose registers, the flag provided for the computed register is set if the data of that register has changed to zero as a result of the computation. For instance, let us suppose that

SUB R0, R1, R2 denotes an instruction to "subtract data in R1 of the general-purpose register from the data in R0 and store the result in R2" and produces a subtraction result of zero. With a microprocessor using conventional condition coding, the flag is set to zero when the computation ends. If a subsequently executed instruction is one which alters the flag state, there will be no evidence remaining to indicate that the general-purpose register R2 data is zero. In the present embodiment, register zero determining portion 32 determines that data to be stored in general-purpose register R2 is zero. Data "0" and the determining result total of 33 bits are sent to the registers 26 from register write portion 50 and are stored in the 32-bit data storage portion of general-purpose register R2 and in the flag respectively.

The formation route of the flag is different when transferring data between the memory and the general-purpose register. For instance, suppose that

LD R0, (R1)

denotes an instruction to "load data stored at R1 in the memory to general-purpose register R0". When this instruction has been carried out, memory access controller 40 controls the reading out of 32 bits of data from R1 in data memory 44. Memory zero determining portion 42 determines if the data read out is zero and sends the result to register write portion 50. Register write portion 50 sends the data and the determining result to registers 26 and writes them into the 32-bit data storage portion of general-purpose register R0 and in the flag respectively.

2. Referencing Flags

Let us consider a case in which data in general-purpose register R2 is referenced by a conditional branching instruction. Now, when

Figure 4:
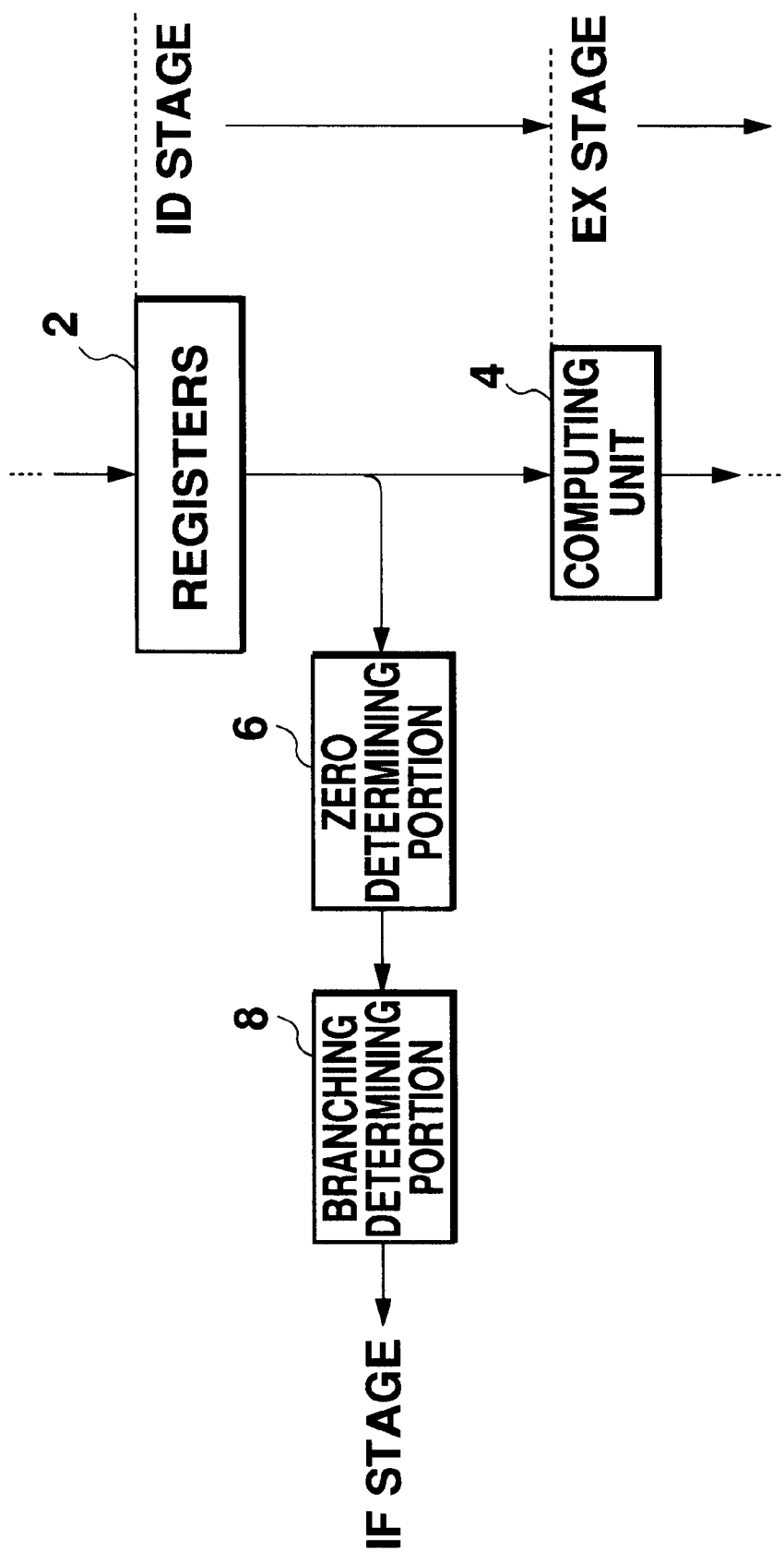
FIG. 4 is a diagram showing a branching determining circuit in a hypothetical microprocessor DLX.
Figure 5:
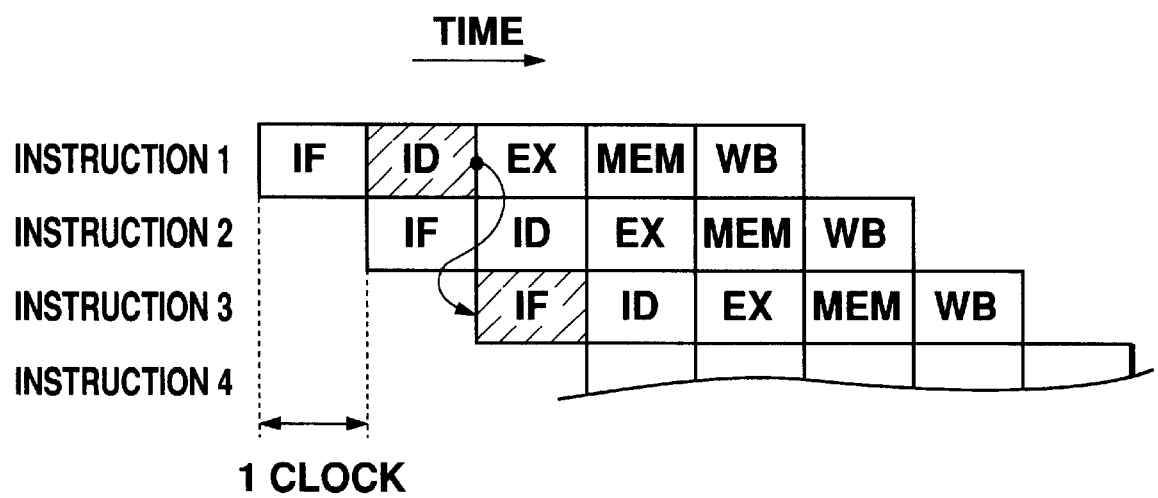
FIG. 5 is a diagram showing pipeline processing when a program branches in a DLX microprocessor.

JPZ R2, (R3)

is an instruction to "branch to address R3 in the memory if the data in general-purpose register R2 is zero," in a conventional method, the data must actually be read out from general-purpose register R2 and a computation must be performed to compare the data with zero. However, in the present embodiment, since the flag is read out simultaneously with the data in general-purpose register R2, it is possible to determine very early in the ID stage whether or not branching should be carried out. Since there is now no need for a circuit such as the DLX zero determining portion 6 shown in FIG. 4, a high clock frequency can be used.

In 1., the flag for data read out from the memory was treated separately, but if the flag is written as a general-purpose register flag, the flag subsequently joins the data of the general-purpose register and there is no need to know that the source address was the memory.

The above explanation described the contents of the present embodiment. The following modifications to the technology of the embodiment are envisaged.

(1) In the present embodiment, a newly-provided flag indicated whether or not data in the general-purpose register was zero, but other examples can of course be envisaged. For instance, the flag can be used to indicate whether or not data can be described in 16 bits, or whether or not the data exceeds a specific value A or such like.

(2) Data forwarding is a method of using the result of a predetermined stage of a certain instruction early in a predetermined stage of another instruction by providing a by-pass between pipeline stages. Forwarding was not mentioned in the above description of the present embodiment, but this feature can of course be incorporated into the system. For instance, by providing a by-pass to the output of stages A~R in the group of general-purpose registers 26, a flag which would ordinarily be fixed at the W stage can be fixed during the A stage and referenced in the R stage of the instruction which immediately follows. Consequently, even when an instruction to write data to a specific general-purpose register is followed by a branching instruction to branch if this general-purpose register data has a predetermined value, the branching instruction can be performed without the need for a stall (a wait clock).

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A pipeline program execution method involving branching process, comprising:

during an execution stage or a memory access stage of executing a first program instruction, determining whether a computation result of the execution stage or a data read out from a memory in the memory access stage has a value belonging to a predetermined set of values;

during register write stage of executing the first program instruction, storing in a data holding unit the computation result or the data read out from the memory, and setting a flag corresponding to the data holding unit to indicate whether the data stored therein has a value belonging to the predetermined set of values as determined during the execution or the memory access stage; and during an instruction decoding stage of executing of a subsequent program instruction which contains a reference to the data holding unit, performing a branching determination by checking the flag corresponding to the data holding unit to determine whether the data stored in the data holding unit has a value belonging to the predetermined set of values without evaluating the data stored in the data holding unit, whereby the speed of the branching determination is increased.

2. A pipeline program execution method involving branching process, comprising:

(a) during execution of a first program instruction, storing a data in a data holding unit, and setting a flag corresponding to the data holding unit to indicate whether the data stored therein has a value belonging to a predetermined set of values; and (b) during execution of a subsequent program instruction involving branching which contains a reference to the data holding unit, checking the flag corresponding to the data holding unit to determine whether the data stored in the data holding unit has a value belonging to the predetermined set of values without evaluating the data stored in the data holding unit.

3. The method of claim 2, wherein the pipeline program execution of each program instruction includes an instruction fetch stage, an instruction decoding stage, an execution stage, a memory access stage, and a register write stage, wherein the step (a) includes:

during the execution stage or the memory access stage of the first program instruction, determining whether a computation result of the execution stage or a data read out from a memory in the memory access stage has a value belonging to the predetermined set of values; and during the register write stage of the first program instruction, storing in the data holding unit the computation result or the data read out from the memory, and setting the flag corresponding to the data holding unit indicating whether the computation result or the data read out from the memory has a value belonging to the predetermined set of values as determined during the execution or the memory access stage; and wherein the step (b) is performed for a branching determination during the instruction decoding stage of the subsequent program instruction, whereby a speed of the branching determination is increased.

4. The pipeline program executing method of claim 2, wherein the predetermined set of values includes zero.

5. The pipeline program executing method of claim 2, wherein the data holding unit is a general-purpose register.

6. A pipeline program execution device for branching process, comprising:

a plurality of data holding units and a plurality of flags each corresponding to a data holding unit;

a computing portion for performing a computation and determining whether a computation result has a value belonging to a predetermined set of values;

a memory access portion for reading out data from a memory and determining whether the data read out from the memory has a value belonging to the predetermined set of values;

a register write portion for storing in a data holding unit the computation result or the data read out from the memory, and for setting the flag corresponding to the data holding unit to indicate whether the data stored in the data holding unit has a value belonging to the predetermined set of values as determined by the computing portion or the memory access portion; and an instruction decoder for decoding a program instruction, the instruction decoder determining whether a program instruction which contains a reference to a data holding unit involves branching determination by checking the flag corresponding to the referenced data holding unit to determine whether the data stored in the data holding unit has a value belonging to the predetermined set of values without evaluating the data stored in the data holding unit.

7. The pipeline program executing device of claim 6, wherein the predetermined set of values includes zero.

8. The pipeline program executing method of claim 6, wherein the data holding unit is a general-purpose register.

* * * * *